United States Patent [19]

Sundström

[11] 4,313,623
[45] Feb. 2, 1982

[54] BOOK HOLDER

[76] Inventor: Hans-Gunnar Sundström, Villavägen 254, S-137 00 Västerhaninge, Sweden

[21] Appl. No.: 100,772

[22] Filed: Dec. 6, 1979

[30] Foreign Application Priority Data

Dec. 7, 1978 [SE] Sweden .............................. 7812605

[51] Int. Cl.$^3$ ...................... B42D 17/00; B42D 1/00
[52] U.S. Cl. ................................................ 281/15 B
[58] Field of Search ................ 40/336; 281/16, 15 A, 281/15 B, 42; 179/146 R, 147, 178

[56] References Cited

U.S. PATENT DOCUMENTS

| | | | |
|---|---|---|---|
| 1,983,443 | 12/1934 | Duceska | 281/15 B |
| 2,592,066 | 4/1952 | Pratt | 179/147 X |
| 2,720,052 | 10/1955 | Daudet | 281/15 B |
| 2,791,865 | 5/1957 | Iscoe | 281/15 B |
| 3,245,696 | 4/1966 | Frank | 281/15 B |
| 3,266,819 | 8/1966 | Huff | 281/15 B |
| 3,272,531 | 9/1966 | Krauth, Jr. | 281/15 B |

FOREIGN PATENT DOCUMENTS 13060 6/1970 Sweden .

Primary Examiner—Paul A. Bell
Assistant Examiner—John S. Brown
Attorney, Agent, or Firm—Pollock, Vande Sande & Priddy

[57] ABSTRACT

A holder for use with a register book having a front surface designed part directed towards a viewer. The holder may be used at a telephone set or a similar apparatus where it is intended to support the front surface behind and above the apparatus. The holder is also useful at instrument panels in cars. In one embodiment the part supporting the front surface is connected to a base unit via joining sections which are arranged by pivotal connections to the base unit. In a second embodiment the part carrying the front surface is equipped with a protruding tongue and the tongue changes into the end edges of the rest of the part via especially designed recesses.

17 Claims, 20 Drawing Figures

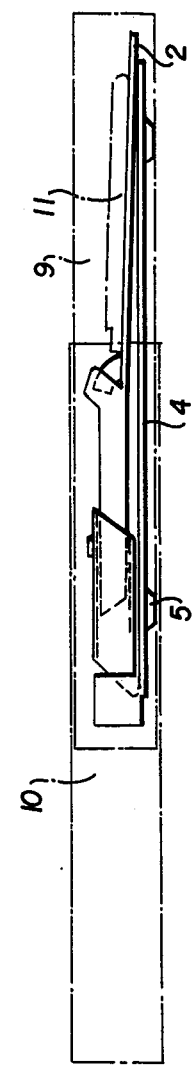
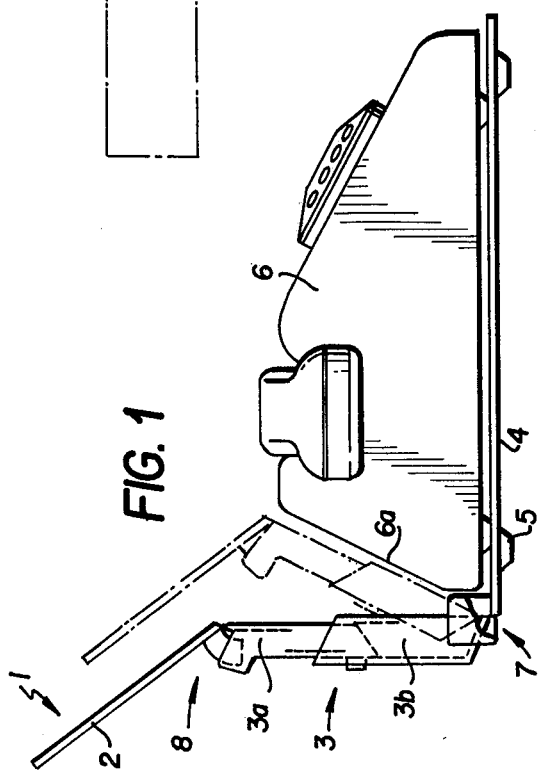
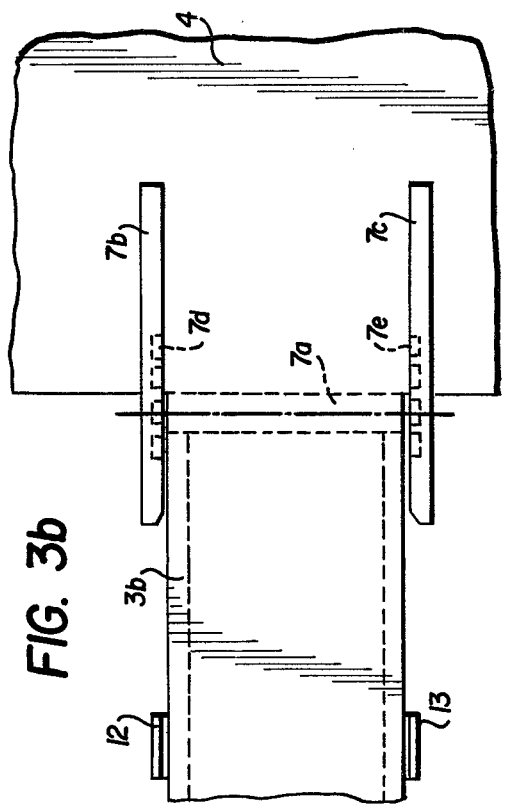
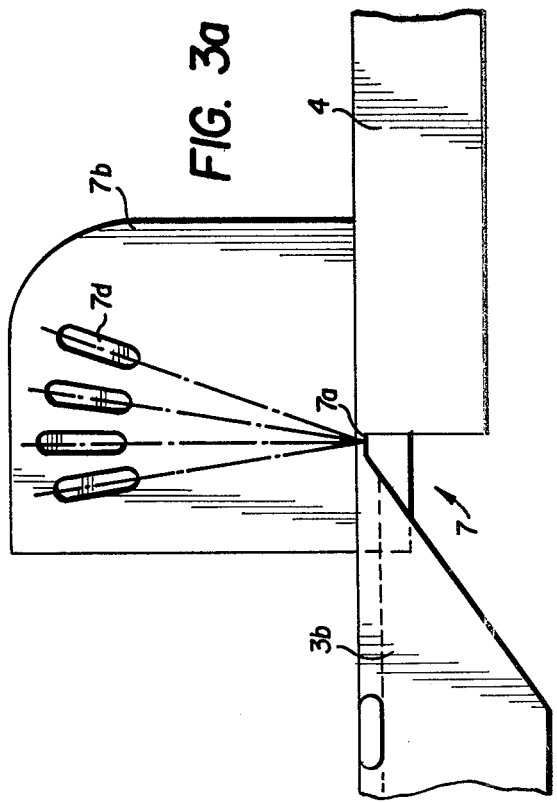

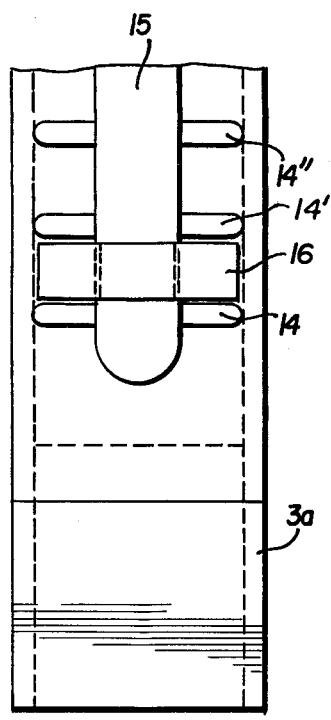
FIG. 4a
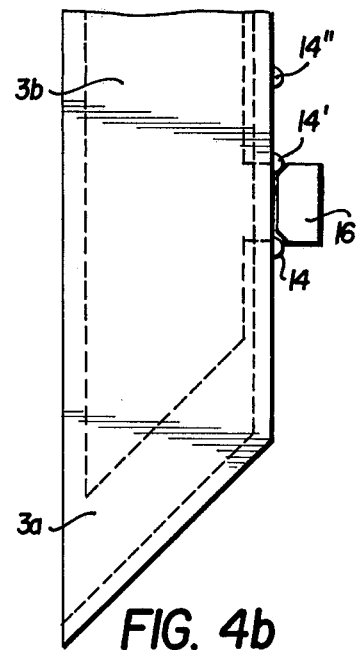
FIG. 4b
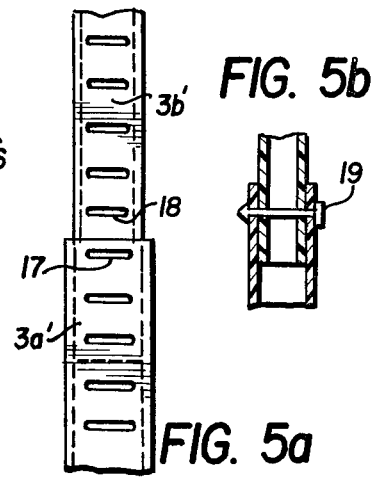
FIG. 5b
FIG. 5a
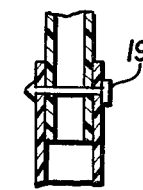
FIG. 5d
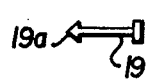
FIG. 5c
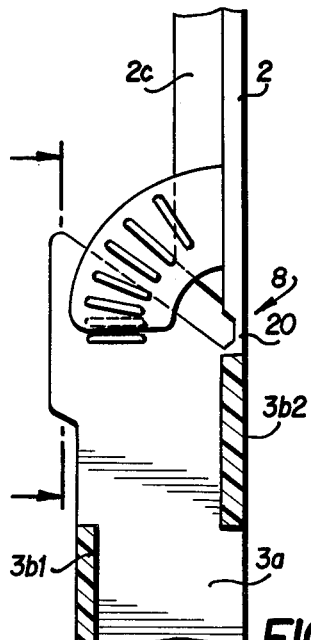
FIG. 6a
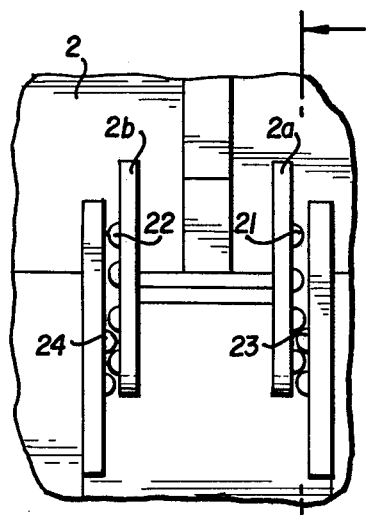
FIG. 6b
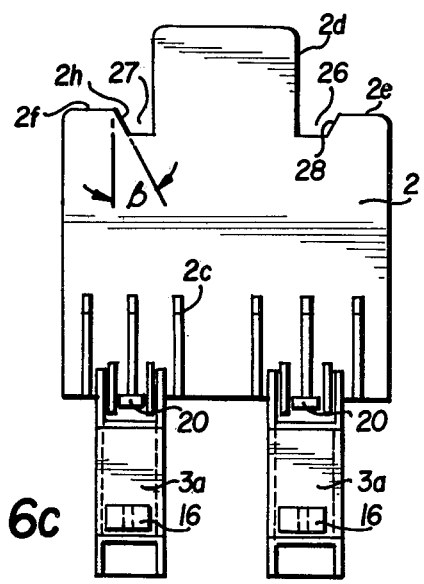
FIG. 6c

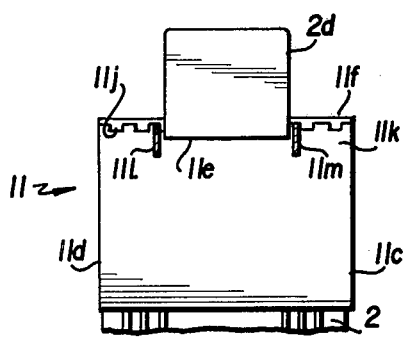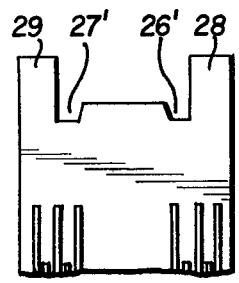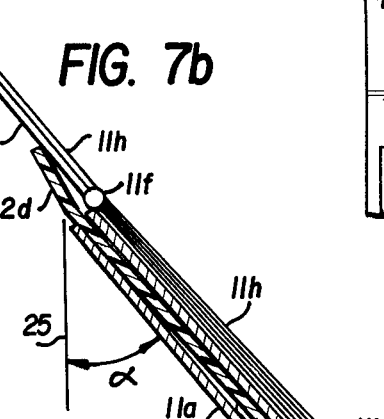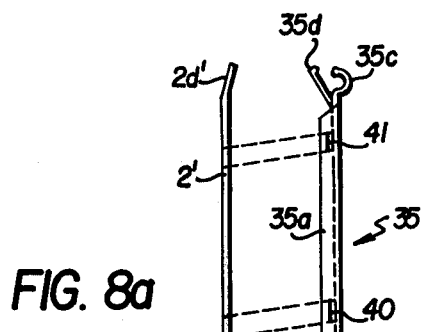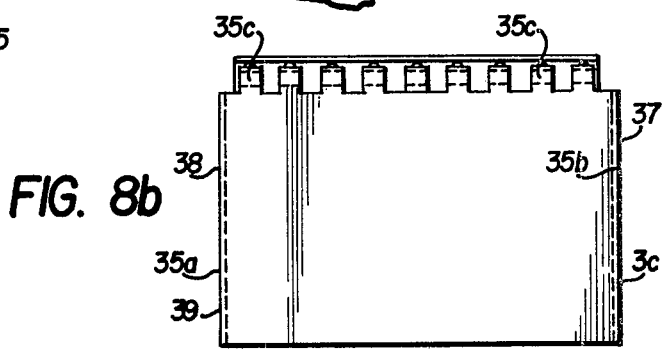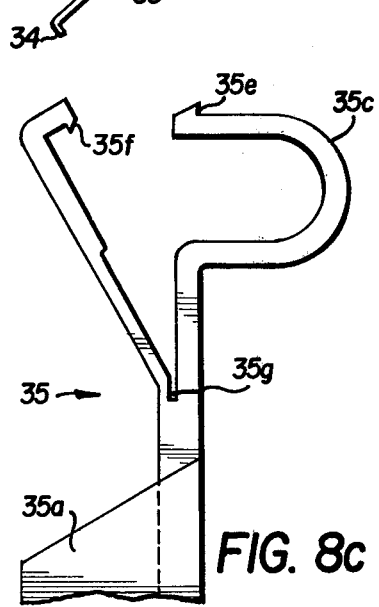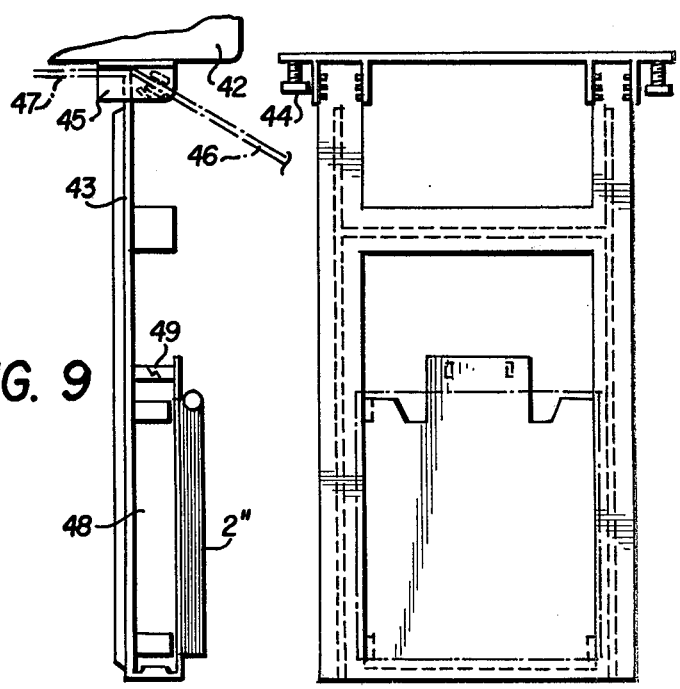

BOOK HOLDER

FIELD OF THE INVENTION

The present invention relates to a holder preferably applicable to a telephone set; and comprises a part having a front surface directed towards a viewer, and located e.g. above and behind the telephone set; and a base unit serving as a fastening and/or placing element for the holder.

Even though the new holder has its most obvious advantages in connection with telephone sets, it may also be used in connection with other kinds if equipment, e.g. calculators etc. Another field of application for the new holder is in connection with cars, where a suitable location is at the instrument panel, for instance between the front seats.

PRIOR ART

The idea of using a holder in connection with for instance a telephone set, with the holder being equipped with a part having a front surface which in a position applied to the telephone set is located above and behind the telephone set and well exposed to or directed towards a viewer is in itself known. The part supports one to the front surface applied register book equipped with front and back cover, and between these located register leaves, arranged with letter signs referrable to the alphabet so the register book can be used as a telephone register. The covers and leaves are arranged with a back bearing along the front plate, making the front covers and register leaves to be turned upwards when the front cover and the register leaves are consulted, while at the same time the back bearing is turning. The front plate is equipped with a tongue extending from its free end in the same direction as the main direction of the front plate. The back cover of the register book is designed with two plate shaped parts joined at the sides and the upper edge. The rear plate shaped part has through slit for the tongue. Due to the fact that the plate shaped parts are not joined at the lower edge, the front plate with the tongue can first be put in from below between the plate shaped parts and further upvards so the tongue extends through the slit in the rear plate shaped part and also extends above the edge of the register book. The part of the tongue extending above the upper edge of the register book serves as a support for the opened front cover and for the opened register leaves in such a way that these in opened position mainly creates a plane in common with the not opened register leaves.

The known holder has also included a fastening part by which the holder has been attachable at the rear of a telephone set of a known design, which at its back has an excavation serving as a handle. At the excavation is a downwards protruding edge with interacts with a hook on the holder, which by two resilient legs are interacting with the back and lower edge of the telephone set and keeps the holder in a fixed position to the telephone set.

A holder with an applied register book according to the above description has had great advantages, one of them from an advertising point of view. A buyer has had the opportunity to have information about himself printed on the front of the register book, in the book itself and/or on the tongue protruding above the register. The information printed as above might include company, address, telephone number, activities etc, thus giving a complete register to the customer, who from then on has been continually reminded about the giver if the consumer has fastened the holder with the register book to the telephone set. The holder and the register book also have had a design which have made them attractive as presentation articles. Due to the fact that it is possible to turn over the leaves of the register book round an axis along the front plate, and the consulted register leaves are kept in an open position in a plane which is mostly identical with the not opened register leaves, a large number capacity for the register book is achieved, and a distinct reading due to the fact that two consulted register leaves have a plane in common. In the non-opened position of the register book, the register leaves protrude a little below the front cover of the book, and these protruding part may be used, when for instance in connection with a telephone register, for the different letter signs of the alphabet.

OBJECT OF THE PRESENT INVENTION

One disadvantage of the so far known holder is the fact that it due to the design of the fastening part is restricted to certain kinds o telephone sets, which implies that one special design of the holder must be manufactured for each variation of the excavation intended as a handle at the back of the telephone set. As regards the known holder, the supporting upper end edges of the front surface located at the protruding tongue must be made to be pushed as far as possible towards the joined upper edge of the back cover when the register book is in position. This is for the reason that no bending tendencies should appear at the upper parts of the back cover or that a special rigidity element should be needed at the plate shaped part of the back cover. The open slit in the rear of the plate shaped parts for the protruding tongue is located at some distance from the upper edge, and the plate shaped parts are at the mentioned edge also joined by welding seams in the longitudinal direction of the tongue.

With the known holder there has been some risks of breakage of material in the rear plate shaped part in connection with the open slit for the protruding tongue and the upper end edge of the plate shaped parts.

As far as the known holder and the known register book is concerned it has also been suggested to seal the back binding, a procedure which may cause disadvantages for instance in connection with storage if one wants to supply different colour alternatives for the front cover of the register book.

In the case the front surface carrying part is designed as a plate, it is essential that, when for instance plastic is used for the holder, the plate has a sufficient rigidity to avoid the need of making the plate too thick.

It is also important to take advantage of the above described principle of the holder in other applications, e.g. in cars.

SUMMARY OF THE INVENTION

According to the concept of the invention, the part carrying the front surface shall be made to be folded down in relation to the base unit, and is for that purpose mounted on the base unit via a joining section which is possible to fold in at least one articulation in relation to the base unit. Furthermore, the joining sections are designed with one or more telescopic legs, making it possible to adjust the plate vertically. The mentioned pivotal connection is arranged in such a way that different distinct levels in the turned up position of the front plate can be achieved. In additional embodiments the part supporting the front plate is articulated in relation to the joining sections so it can be adjusted to different inclinations in relation to these.

In addition more detailed construction arrangements for the articulated and adjustment functions of the mentioned pivotal connections are described. The belonging parts are also best arranged so the part supporting the front surface and the joining section in the folded position of the holder is close to the upper surface of the base unit, in order to achieve a holder having small dimensions. In the mentioned folded position, the register book must be applicable at the back of the part with the front surface.

According to the idea of the invention it is also suggested that, apart from the folding down problems, advantages should also be gained by the realization that, at the front surface carrying part, its protruding tongue s shall be changed into the rest of the upper end edge parts via recesses. By the invention is suggested a specific design of these recesses which makes it possible to push the end edge parts to a maximum position against the upper edge of the register book between the plate shaped parts of its back cover without risking breakage of the material in the rear plate shaped part.

The invention also suggests that the register book shall be provided with a special supporting part applicable to the front plate. The supporting part is equipped with hook shaped members, to which the cover(s) of the register book and register leaves are to be hooked on individually. To the hook shaped members are arranged a locking device by which the hooked on covers and register leaves can be locked. By the invention it will also be possible to make use of the above mentioned advantages in e.g. cars.

By the suggested design significant advantages are achieved, i.a. with the possibility to turn up and fold down the carrying the front surface in combination with a base unit intended to extend along the lower parts of the equipment in question. The use of the holder will no longer be restricted to one single kind of apparatus. The part carrying the front surface is turned up when used and the telephone set is placed for instance on the base unit, at which the front surface will be located behind and above the telephone set. In the case foldability is introduced between the part carrying the front surface and the joining sections and the joining sections are arranged to be adjustable in vertical direction, advantages are also gained due to the fact that the part carrying the front surface can be given an accurate position in relation to the back parts of the mantle of the telephone set, independently of the inclination of the casing and its height at its rear parts.

The foldability of the holder also gives advantages from aspects of distribution. The arrangement of folding down the unit gives the holder small dimensions. This will make dispatch to individual persons (customers) cheaper by decreasing postage. The foldability will also lower the costs in connection with printing.

The register book can in the folded down position of the holder be put at the back of the front surface of the carrying part. The holder can when manufactured be put into a two-piece carton, one piece of which need only be partially removed during the printing of the front cover of the register book. When the mentioned piece of the two-piece carton is removed or put aside, the cover of the register book is exposed, making it possible to print; the part with the front surface used as a support. In this way the holder and the register book can be packed and finished as a whole before printing, and it is not necessary as before to keep cartons, holders and register books in stock separately. Only when printing is decided and performed is the final packing executed.

By the special design of the recesses at the transitions between the protruding tongue of the part carrying the front surface and other end edge parts, efficient support along the whole back plane in a vertical direction of the register book can be achieved. No folding tendencies due to head that softens the used material (semi-hard PVC-plastic) will arise in the back parts of the cover of the register book nor need these be strengthened by additional expensive supporting parts. Though plastic material, in itself unexpensive, is used for the cover, an application to the part carrying the front surface is achieves which is robust and stands the daily use that a register of this kind is usually exposed to. The register book gets a rigid connection to the part carrying the front surface, which is a prerequisite for i.a. making it easy turn over the leaves and to read.

Manufacturing and storing procedures are further facilitated due to the fact that the special binding and supporting device can be used for the register book. The binding and supporting device also simplifies the register book as such, since its back cover can be eliminated. The leaves of the register book can be brought together and suspended separately, as also can the cover of the register book. The front cover which one often wants to supply in different colours can, after the colour has been decided upon, be brought together with the rest of the register leaves, which is independent of the choice of colour for the front cover. The binding and supporting device and its principle of holding the register leaves and covers is also advantageous in that way that the register leaves are easy to replace, which can be regarded as an advantage in some cases of normal use of the register book.

In the mentioned further development is also suggested such a construction of the holder that makes possible production of the holder in one and the same injection moulding machine. Those advantages obtained with the known register holder may not also be transferred to other ranges of application, for instance the car branch.

However, what can mainly be regarded as significant for the new holder is described in detail in the specification and defined in the following claims.

BRIEF DESCRIPTION OF THE DRAWINGS

The presently suggested embodiments of a holder displaying the significant features of the invention are presented in the following description, with references given to the enclosed construction drawings, wherein:

FIG. 1 shows in a lateral view a downwards foldable holder which together with the base unit forms a stand for a telephone set, whereby the part carrying the front surface and the joining section for this are shown in two alternative positions.

FIG. 2 shows in a lateral view the holder according to FIG. 1 in a folded down position and placed in a carton consisting of two from each other removable carton parts;

FIG. 3a shows in a lateral view a first articulated position between the joining section and the base unit, and at the first pivotal connection located locking devices by which the joining section can be arranged in different positions of inclination in relation to the base plate;

FIG. 3b shows in a horizontal view the first articulation with locking devices according to FIG. 3a;

FIG. 4a shows in a view from behind joining portions in the form of telescopic legs equipped with devices which by a stop location arrangement makes possible different extension positions between the portions of the telescopic legs;

FIG. 4b shows a lateral view of the telescopic legs according to FIG. 4a;

FIG. 5a shows in a view from behind a modified embodiment in comparison with that shown in FIG. 4a and 4b;

FIG. 5b shows a longitudinal section in a lateral view of the telescopic legs according to FIG. 5a equipped with a locking device;

FIG. 5a–c shows different views of the locking device according to FIG. 5b;

FIG. 6a shows a lateral view a second pivotal connection between the joining section and the part carrying the front surface, and at the second articulation located stop location members which give distinct adjustment positions between the part and the section;

FIG. 6b shows in a view from behind the part and the section with the second articulation and belonging stop members according to FIG. 6a;

FIG. 6c shows a view from behind i.a. the part;

FIG. 7a shows a view from behind the part carrying the front surface with applied register book;

FIG. 7b shows principally a longitudinal section of the holder with the register book in opened position;

FIG. 7c shows a view from behind a modified version of the part carrying the front surface;

FIG. 8a shows in a lateral view a holder with a different base unit and joining section and one to the part carrying the front surface attachable supporting part for the register book;

FIG. 8b shows a front view of the binding and supporting device according to FIG. 8a;

FIG. 8c shows a lateral view a detail of the supporting part according to FIG. 8a and 8b; and, FIG. 9 shows a lateral view of a modified version of the holder to be used at instrument panels.

DESCRIPTION OF THE PREFERRED EMBODIMENT

In FIG. 1 a part carrying a front surface 1 is indicated at 2. The mentioned part consists of a plate about 2 mm thick extending in perpendicular direction in relation to the plane of the page including FIG. 1. The front plate 2 is, via a joining section 3, connected to a a base unit in the form of a base plate 4, supported on a foundation via rubber feet 5 or the like. The base plate 4 is intended to carry a telephone set 6, with the front surface 1 preferably located behind and above. The joining section in the present case consists of two telescopic legs, the different part of which are marked 3a and 3b. The joining sections 5a, 3b are each connected to the base plate 4 via a first articulation 7 making the joining sections 3a, 3b adjustable to different positions of inclination as well as being completely foldable against the base plate 4 to achieve a folded condition of the holder. The front plate 2 is in two second articulations arranged to be turned in relation to the telescopic legs 3a, 3b so it can be put in different inclinations in relation to these. The second articulations also makes it possible for the front plate 2 to make mainly parallel contact against the base plate when the holder is in a folded position.

The joining sections or the telescopic legs are also adjustable in a vertical direction so the front plate 2 can assume different heights above the telephone set 6, making the holder adaptable to a large number of typefaces. The joining sections 3a, 3b can be adjusted in relation to the inclination of the back edge 6a of the casing of the telephone set 6. In a corresponding way the front plate 2 can be adjusted for a suitable elevation in relation to the joining sections so practical reading and turning function are achieved for a register book (not shown in details in FIG. 1).

According to the following, both the pivotal connections and the height adjustment devices are designed with stopping devices working by snap-on functions which give distinct positions as regards height and elevation.

FIG. 2 shows the holder in folded position and placed in a carton consisting of a box shaped inner part 9 and a tube shaped outer part 10 intended to be pushed over the box 9 so the opened part of the latter is covered. The tube 10 is partly pulled out so a register book 11 placed on the front plate 2 is exposed when the box is opened. The register book is in its folded position and its front cover is directed upwards. In connection with the use of the holder and the register book there is often a wish for printing on the front cover, for instance by a hot stamping method, where a hot punch is pressed against the cover with a foil between, the foil being pressed into the material of the cover, which in the present case consists of a plastic material.

Due to the above described construction of the holder and the carton, the holder can be packed when manufactured at the factory and after that transported to the printing plant which is usually a specialised unit separated from the rest of the production facility. At the printing plant the stamping can be performed without the holder being removed from the carton, only the tube 10 need temporarily be partly pulled out to the position indicated in FIG. 2. When the hot stamping of the holder and the book is finished, the carton is closed again.

FIG. 3a and 3b are intended to show a first pivotal connection in detail. The holder is designed in such a way that it can be produced with only one injection in a plastic injection moulding mashine. The frist articulated portion therefore consists of a transition 7a of the same material as the other parts of the holder, namely propene, amide or acetal plastic. In order to attain the articulation 7a the plastic material is here thinner than the rest of the material, for instance 0.1–0.2 mm. The part 3b of the telescopic leg is shown in a completely folded down position in FIG. 3a. To achieve distinct positions for the part 3b of the telescopic leg when in turned up position, the base plate is at each first articulation equipped with two parallel extending, plate-shaped parts 7b and 7c, each provided with four spaced excavations or openings 7d and 7e, respectively. Preferably, each opening 7d is aligned with an opening 7e. The part 3b of the telescopic leg is provided with elastic members 12 and 13 which when the telescopic leg part is turned up can by a snap-in function interact with the mentioned excavations or openings and give the telescopic part four distinct elevation positions, depending on what pair of opposite openings 7d, 7e the members interact with FIGS. 3a and 3b show the first articulation 7 and belonging stop and snap-in devices for one of the telescopic legs. The second telescopic leg is designed in exactly the same way as regards the first articulation stop and snap-in devices.

FIGS. 4a and 4b give a more detailed view of the design of each telescopic leg. The outer telescopic leg section is U-shaped and has at the lower part the back of the U-shape turned from the base plate. At the upper part the U-shape of the telescopic leg section is turned (see FIG. 1) so the inner leg section 3b gets due support in the outer leg section. On the back of the outer side of the first mentioned leg part are arranged a number of ridges 14, 14', 14" at different heights and located on each side of a vertical through opening 15 along the back. The inner telescopic leg section 3b is provided with a member 16 protruding via the opening, the member interacting with the ridges on both sides of the opening on section 3a. The member 16 is also arranged so it can be snapped over the ridges depending on how strong force is acting on the portions 3a and 3b. In the FIGS. 4a and 4b, the leg parts are shown in their most retracted positions. If the leg parts are parted, the member 16 will snap over the ridges above. When the parting forces cease the member 16 will rest on the next pair of ridges below, and by that the telescopic leg parts are given a distinct position for drawing the portions apart etc. The function is corresponding when they are pushed together.

The FIGS. 5a–5c show a modified embodiment of extractions or openings. In this case the telescopic leg portions 3a' and 3b' are provided with a number of correspondent through slits 17 and 18. In the desired extracted position between the leg parts are inserted in a corresponding pair of slits a locking member 19 provided with an edge 19a with a snap-in function and a wedge shaped indentation 19b which facilitates the introduction of the member into the pair of slits.

A second pivotal connection is generally indicated at 8 in FIG. 6a. Connection 8 constitutes a distinct articulation formed by a link 20 joining telescopic outer leg part 3a with base plate 2. Link 20 is formed of the same material as the other parts of the holder and serves to allow base plate 2 to be pivoted with respect to telescoping part 3a. Inner telescopic leg part 3b is U-shaped and includes a lower back part 3b1 from which member 16 protrudes. Likewise, leg part 3a is also U-shaped and includes an upper front part 3b2 which changes into transitional link 20.

The front plate 2 is at each second articulation 8 equipped with a pair of plate-shaped, upwardly protruding members 2a and 2b which extend parallel to one another. The mentioned members are provided with a number of first ridges 21 and 22 respectively, arranged after each other and interacting with corresponding section ridges 23 and 24 respectively, on the inner walls of the inner telescopic leg parts. The second ridges are two in number on each inner wall. The elasticity of the material in the inner walls of the inner telescopic leg parts and in the parts 2a and 2b are chosen so the ridges located opposite to each other can be forced past each other by forces on the front plate and the telescopic legs, but as soon as the adjustment forces cease, the ridges return to interacting position and check the front plate in the chosen position of elevation between the front plate and the telescopic leg parts.

In FIG. 6a is also shown, in a lateral view, a rigidity beam 2c for the front plate 2. A number of such rigidity beams are arranged on the back of the front plate. The rigidity beams project outwardly from the back surface of the front plate between 3–5 mm.

The FIGS. 7a and 7b show from behind the register book 11 resting on the front plate 2. The register book is designed with a back cover comprising two plates 11a and 11b joined by welding at the edges of the sides 11c, 11d. The plate at the back has at the top a through slit 11e, through which the tongue 2d of the front plate 2 extends when the register book is in its applied position. The register book is equipped with one in itself known binding arrangement (GBC) 11f for the front cover 11g and the register leaves 11h. The plates 11a and 11b are also joined by welding at the upper end edges 11i and 11k located at the side of the slit 11e. The plates 11a and 11b are also joined by two shorts welding seams 11l and 11m. The welding seams runs from the mentioned upper end edges in vertical direction along the book.

The binding arrangement 11f runs along the front plate 2 so the front cover 11g and the register leaves 11h can be turned over from the lower to the upper position. Principally the axis of the binding device is arranged in a way in itself already known, consisting of a half cylinder provided with semi-circular hooks which at one of its ends are fastened to one of the long sections of the semi-cylinder. The covers and register leaves are provided with recesses corresponding to the hook and when the covers and leaves have been hooked on to the hooks at least some part of the latter are welded at their free ends to the other long section of the semi-cylinder so the covers and the register leaves are secured.

The front cover and the register leaves are easily hinged on the hooks and in their opened position the rigid front cover is supported by the the tongue so the upper opened register leaf will be mainly in the same plane as the first not lifted register leaf. A Well-arranged double reading surface is achieved in that way. The register leaves protrude below the lower edge of the front cover and on these protruding parts 11h' the letters of the alphabet are indicated. The space on the register leaves are divided according to the frequency of the use of the letters for instance for names. Thus letter A takes a larger space in the register than the letter C. The letter A can be allotted for instance a whole register leaf, whereas the letter C only gets a half register leaf. The plastic is in that connection covering both the front and the back sides of the register leaves so for instance the upper register leaf is allotted the space for the letter and its back is allotted the space for the letter B and C etc. In the embodiment are used twelve register leaves which together share all letters of the alphabet. The downwards protruding parts have also been printed so the viewer sees all the letters at the same time. For a practical turning and reading function the front plate 2 shall form an angle $\alpha$ within 35°–45°, preferably about 40° in relation to a vertical line 25.

Returning to FIG. 6c it can be seen that the tongue 2d changes into the end edge portions 2e and 2f via the distinct recesses 26 and 27. The mentioned recesses allow the end edge portions 2e and 2f to reach the upper edge of the plates 11a and 11b which constitute the back cover. The seams 11l, 11m run along the recesses and it important to note that the recesses are designed to allow the end edge portions 2e and 2f to be pushed a maximum distance towards the upper edge of the register book without risking a break in material forming the back plate 11a. According to the concept of invention recesses are arranged with an inclining edge 2g and 2h which from the bottom of each recess has an outwards directed elevation B. A suitable angle value for B has turned out to be 30°–40°, preferably about 35°. The edge 2g and 2h can also be given a curved design. The average heights and widths of the recesses are 10×10 mm.

FIG. 6c also shows the rigidity beams of the front plate, these beams running upwardly from the lower edge of the front plate about ⅓ of the length of the front plate.

FIG. 7c shows another variation of the embodiment of the front plate where the tongue 2d has been replaced by two outer tongues 28 and 29, intended to protrude through corresponding recesses on a back plate of the back cover of the register book. Also, distinct recesses 26' and 27' are used, and the recesses also change into the rest of the end edge portions of the upper side of the front plate via inclined portions.

In FIG. 8a the front plate is marked 2' and the protruding tongue according to FIG. 6c is marked 2d'. The front plate is by joining section 31 connected to one in itself known base unit comprising a hook 32 and two parallell springy legs, only one of which is shown, marked 33. Each springy leg has at its lower part a member 34 in angular position. The hook 32 is arranged to interact with an excavation or opening at the same time as the springy legs 33 interact with the back of the casing so their angular members 34 can grip round the lower edge of the casing. This holder constitutes a non-foldable or non-turnable alternative.

To the front plate according to FIG. 8, as to the above described front plates of the angular alternatives, are arranged by a snap-in device a carrying part 35 for the above mentioned register book. The carrying part is to be snapped in to the side edges of the front plate 2' via two folded down side sections 35a and 35b. The front plate is provided with from the side edges extending elastic studs 36, 37, 38 and 39 which are to be snapped in to corresponding excavations or openings 40, 41 of the folded down side sections.

The binding and supporting device has at its top number of hook shaped members 35c, arranged at some distance from each other, on which the leaves and the cover(s) of the register book is to be hooked on via recesses. The hook shaped members 35c are to interact with a locking member 35d which is articulated in the binding and supporting device and which in its locked position interacts with the free ends of the hook shaped members. In the mentioned locked position the hooked on register leaves and cover(s) are prevented from falling out.

FIG. 8c shows an enlargement of the locking device and the hook shaped members in question. The hook shaped member has a head 35e which interacts with a head 35f on the locking device. The locking device is made of the same material as the rest of the binding and supporting device, propene, amide or acetal plastic etc, and has at its articulation 35g a transition which is so thin that a proper articulated function is achieved. The elasticity of the hook shaped members and the locking device are at that supposed to be sufficient for the locking device to be opened, implying for instance that the register leaves can be changed and at the same time storing in general is facilitated.

FIG. 9 is intended to illustrate an embodiment suitable for use with the instrument panel 42 in for instance a car. A frame or a stand 43 is connected via joining devices 44 at the bottom side of the instrument panel. The stand is movable round an articulation 45 between an extended position marked 46 and a folded down position 47 under the instrument panel. The stand 43 carries the front plate 2'' on its front side and a plastic pocket 48 on its back side. The front plate can be joined to the stand at the stand the register book is easy to push on to the front plate, which after that can be folded back to its parallel position in relation to the frame of the stand. Hook-shaped devices are arranged to prevent, by means of snap-in functions, the front plate from falling out when the holder is folded back. In the extended position the front plate will function according to the above.

In the above described embodiments the register leaves are put in plastic pockets which in their turn are provided with the excesses for hooking on to the binding axis of the register book. The mentioned plastic pockets are made of PVC-foil. The plastic material in the cover of the register book is made of semi-hard PVC. The leaves to be pushed into plastic pockets can be made of standard paper which is to be complemented with wanted text, numbers etc. The invention is not restricted to the above as an example described embodiment, but can be subject to different modifications within the frame of the following patent claims and invention idea.

The suggested construction of the holder according to the invention is suitable for rational and economic production. The design also allows a simplified handling and the different parts can be stored in a comparatively small assortment and be assembled to the final product in relation to received orders. The holder can be completed and packed before the stages of stamping the front cover of the register book. As regards its use the holder with belonging register book represents a practical telephone register which offers eminent advantages from advertisement and gift aspects.

What I claim is:

1. A combination register book and holder assembly comprising:
    a mounting plate including an edge portion having a tongue-shaped flange projecting outwardly therefrom, said tongue-shaped flange including an end portion extending at an angle to a plane extending parallel to a front surface of said mounting plate;
    said mounting plate further including a pair of distinct recesses extending into portions of said mounting plate disposed on opposite sides of said tongue-shaped flange;
    a register book including front and back cover portions arranged on opposite sides of said mounting plate, with one of said cover portions including a slit of sufficient size to allow at least a portion of said tongue-shaped flange to project therethrough; and
    attachment means for joining said front and back cover portions into a pocket having at least one end of sufficient size to allow for projection of said mounting plate through said pocket until said tongue-shaped flange projects outwardly through said slit and said mounting plate edge portion is disposed adjacent to an interior end surface of said pocket, whereby said tongue-shaped flange provides maximum support for said register book without risking a break in said cover portions.

2. A combination register book and holder assembly according to claim 1, wherein said attachment means comprises a pair of spaced seams joining said front and back cover portions at locations coinciding with said distinct recesses, with each seam extending substantially parallel to the direction of motion of said mounting plate within said pocket, thereby significantly reducing the risk of ripping said cover portions.

3. A combination register book and holder assembly according to claim 1, wherein each recess includes a pair of side walls, with one side wall in each recess inclined away from a remaining side wall.

4. A combination register book and holder assembly according to claim 3, wherein each inclined side wall forms an angle of between 30°–40° with a plane extending parallel to the remaining side wall.

5. A combination register book and holder assembly comprising:
   a mounting plate including an edge portion having a pair of tongue-shaped flanges each projecting outwardly therefrom, each tongue-shaped flange including an end portion extending at an angle to a plane extending parallel to a front surface of said mounting plate;
   said mounting plate further including a pair of distinct recesses extending into spaced portions of said mounting plate disposed between said pair of tongue-shaped flanges;
   a register book including front and back cover portions arranged on opposite sides of said mounting plate with one of said cover portions including a pair of slits each of sufficient size to allow at least a portion of one of said tongue-shaped flanges to project therethrough;
   attachment means for joining said front and back cover portions into a pocket having at least one open end of sufficient size to allow for projection of said mounting plate through said pocket until each tongue-shaped flange projects outwardly through a separate slit and said mounting plate edge portion is disposed adjacent to a confronting end surface of said pocket, whereby said tongue-shaped flanges provide maximum support for said register book without risking a break in said cover portions.

6. A register book holder and support assembly comprising:
   a support assembly including a base unit and an attached mounting plate extending therefrom, said mounting plate including front and rear surface portions oppositely disposed from one another;
   a supporting part releasably attached to said mounting plate and disposed adjacent to said front surface portion, with at least one hook-shaped element extending from an upper section of said supporting part for receiving a plurality of separate register leaves having aligned openings through which the at least one hook-shaped element extends;
   said supporting part further including at least one retaining member attached to said upper section for pivotal movement toward and away from said at least one hook-shaped element; and
   complimentary locking means formed on said retaining member and said hook-shaped element for selectively locking said retaining member to said hook-element, thereby preventing removal of the register leaves mounted on said hook-shaped element.

7. A register book holder and support assembly according to claim 6, wherein a plurality of separate hook-shaped elements and a plurality of separate retaining members each extends from said upper section of said supporting part, wherein each retaining member is attached to said supporting part for pivotal movement toward and away from a separate hook-shaped element.

8. A register book holder and support assembly according to claim 7, wherein complimentary locking means are formed on each hook-shaped element and each retaining member for selectively locking each retaining member to a separate hook-shaped element after said hook-shaped element is inserted through aligned openings in a plurality of register book leaves.

9. A register book holder and support assembly according to claim 8, wherein said complimentary locking means comprises first locking flange members formed on each retaining member and second locking flange members formed on each hook-shaped element, forming a plurality of separate pairs of locking flange members capable of interacting to prevent pivotal movement of each retaining member away from its respective hook-shaped element.

10. A register book holder and support assembly according to claim 9, wherein each pair of locking flange members are of sufficient size so as to overlap and abut one another as said retaining members are pivoted toward their respective hook-shaped elements, with further pivoting movement of said retaining members causing said elements to slightly deform and subsequently snap back into their original shape as said locking flange members reach their locked positions, whereby said overlapping locking flange members prevent said retaining members from pivoting away from said hook-shaped elements.

11. An adjustable register book holder assembly comprising:
   an adjustable connecting assembly positioned between and attached at one end to a base unit and attached at an opposite end to a mounting plate capable of supporting a register book resting thereon;
   said adjustable connecting assembly including a first end portion integrally attached to said base unit, said first end portion having a reduced thickness as compared to the overall thicknesses of said adjustable connecting assembly and said base unit, whereby said first end portion constitutes an articulation allowing said adjustable connecting assembly to be selectively folded toward said base unit for storage and folded away from said base unit for use.

12. An adjustable register book holder assembly according to claim 11, wherein said adjustable connecting assembly includes a second end portion integrally attached to said mounting plate, said second end portion having a reduced thickness as compared to overall thicknesses of said adjustable connecting assembly and said mounting plate, said second end portion thereby constituting an articulation allowing said mounting plate to be pivoted with respect to said adjustable connecting assembly as required.

13. An adjustable register book holder assembly according to claim 12, wherein said adjustable connecting assembly includes a pair of telescoping leg members, with a first telescoping leg member including said first end portion and a second telescoping leg member including said second end portion.

14. An adjustable register book holder assembly according to claim 13, wherein said pair of telescopic leg members includes an outer leg member having a wall with an opening extending therethrough with and a plurality of separate ridges extending outwardly from said wall on either side of said opening, said pair of telescopic leg members further including an inner telescopic leg member having a protruding member extending through said opening in said outer telescopic leg member and selectively positionable between various pairs of adjacently disposed ridges for releasably retaining said protruding member and said attached inner telescopic leg member against movement relative to said outer telescopic leg member.

15. An adjustable register book holder assembly according to claim 13, wherein a pair of parallel extending plate-like members extend outwardly from a surface of said mounting plate and closely confront opposite side portions of said second telescopic leg member attached to said mounting plate, said pair of plate-like members each including at least one ridge overlapping and extending between a pair of ridges formed on each side portion of said second telescopic leg member to selectively retain said mounting plate from pivoting relative to said adjustable connecting assembly.

16. An adjustable register book holder assembly according to claim 15, wherein each plate-like member includes a plurality of separate ridges for selectively varying the angle of said mounting plate.

17. An adjustable register book holder assembly according to claim 13, wherein said base unit includes a pair of parallel extending, plate-like members positioned on opposite sides of said first telescopic leg member, wherein each plate-like member includes a plurality of spaced apertures formed in a surface confronting the remaining plate-like member, said second telescopic leg member including a pair of protrusions extending outwardly from opposite side portions, wherein said protrusions are positioned to simultaneously enter various pairs of said apertures to lock said adjustable connecting assembly into various predetermined positions relative to said base unit.

* * * * *